(12) United States Patent
Sammons et al.

(10) Patent No.: US 6,399,913 B1
(45) Date of Patent: Jun. 4, 2002

(54) ERGONOMIC TIG TORCH

(75) Inventors: Michael A. Sammons; Richard A. Duba, both of Appleton; Ronald W. Colling, Kaukauna, all of WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/703,001

(22) Filed: Nov. 1, 2000

(51) Int. Cl.$^7$ ............................................... B23K 9/167
(52) U.S. Cl. .......................................... 219/75; 219/144
(58) Field of Search .................................. 219/75, 144

(56) References Cited

U.S. PATENT DOCUMENTS

| | | | | |
|---|---|---|---|---|
| 2,376,943 A | * | 5/1945 | Smith ........................ | 219/144 |
| 2,400,285 A | * | 5/1946 | Buck ........................ | 219/144 |
| 2,512,707 A | * | 6/1950 | Anderson ................... | 219/75 |
| 4,524,260 A | * | 6/1985 | Rotilio ...................... | 219/75 |
| 4,543,461 A | * | 9/1985 | Hill ........................... | 219/75 |
| 5,206,472 A | * | 4/1993 | Myking et al. ............. | 219/75 |
| 5,338,917 A | | 8/1994 | Stuart et al. | |
| 5,571,427 A | | 11/1996 | Dimock et al. | |
| 5,819,594 A | | 10/1998 | Sjovall | |
| 5,916,465 A | | 6/1999 | New et al. | |

OTHER PUBLICATIONS

Speedway—High Performance TIG Welding Torches—TEC Torch Company, Inc.—Copyright 1998.
Weldcraft—Weldcraft Products, Inc.—Set of Product Literature—WP–22, 2 pgs. 9/95; QCS—2 pgs.; WP–18SC—2 pgs.—1991; HPN—2 pgs.; MT–125—2 pgs.; Flex Torches—4 pgs. 2/96; Crafter Series—2 pgs. 1995; Incredible—2 pgs.; Weldcraft . . . the TIG Torch innovators—8 pgs.—4/93.

* cited by examiner

Primary Examiner—Clifford C. Shaw
(74) Attorney, Agent, or Firm—Mark W. Croll; John H. Pilarski; Donald Cayen

(57) ABSTRACT

An insulative grip for a TIG torch is held in a person's fingers like a pen or pencil. The grip has an external contour that has multiple gripping areas. The size and shape of the gripping areas conform to the person's thumb and first two fingers when he holds the grip. The gripping areas reduce the tendency for the torch to move in the person's hand. The gripping areas also provide an indication of the orientation in space of the torch electrode when the person holds the torch. The torch may be either water-cooled or air-cooled.

17 Claims, 3 Drawing Sheets

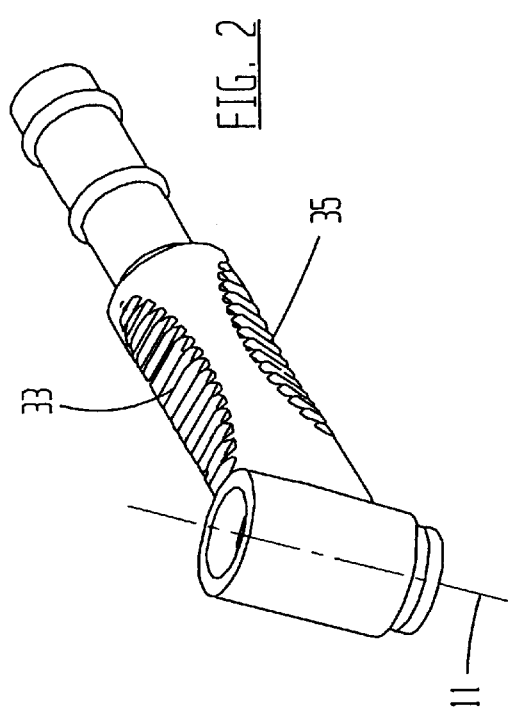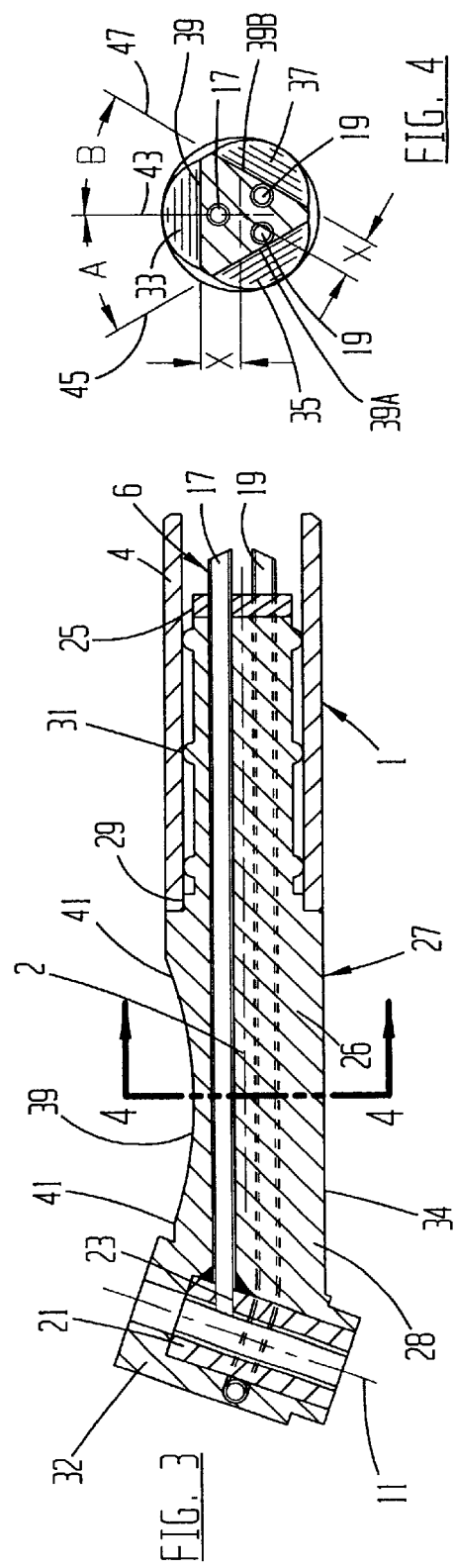

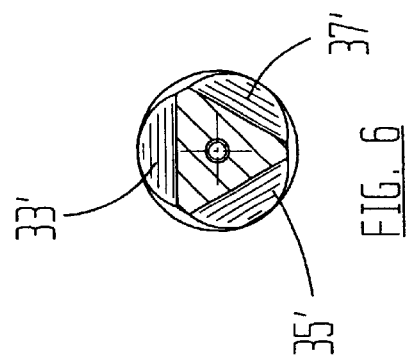
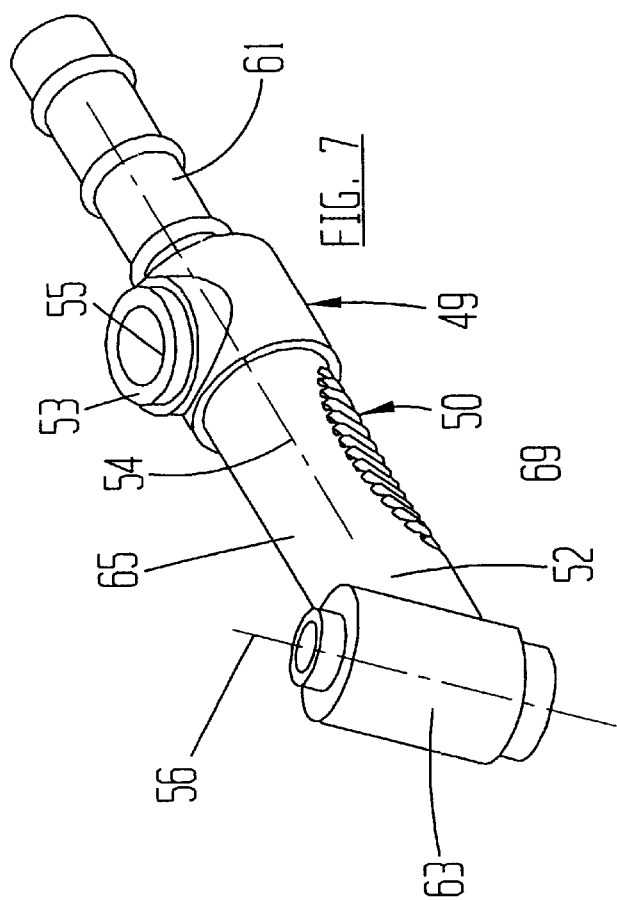
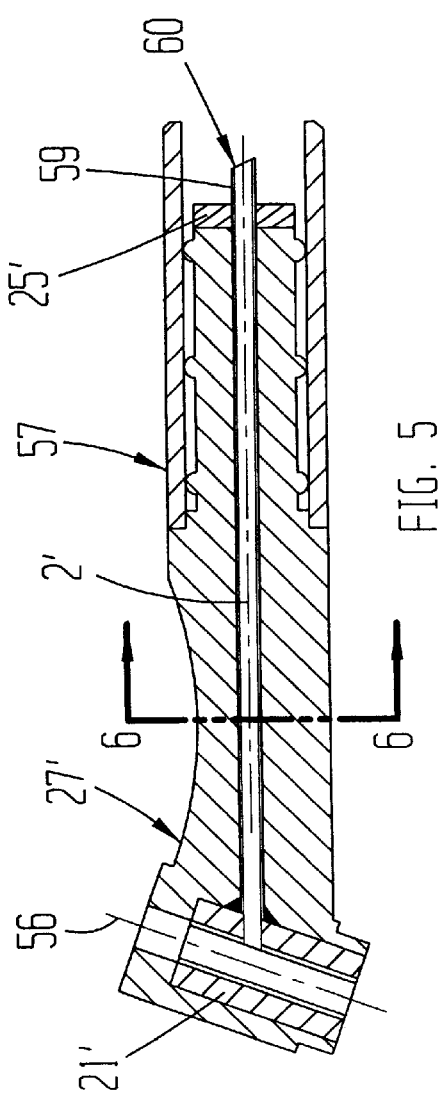

ERGONOMIC TIG TORCH

BACKGROUND OF THE INVENTION

1. Field of the Invention

This invention pertains to welding torches, and more particularly to a tungsten inert gas (TIG) welding torch having enhanced tactile qualities.

2. Description of the Prior Art

In TIG welding, a person directs the tip of a tungsten electrode and a stream of inert gas to a work surface. The electrode and passage for the gas are contained in a relatively small torch. Some TIG torches also include passages for water cooling. The torch includes a handle that in some instances is held in a person's hand. The torch is connected to a flexible cable, which conducts electrical power from a welding machine to the torch. In air-cooled torches, the cable is incorporated into a hose that also delivers the inert gas to the torch. In water-cooled torches, the cable is incorporated into a water return hose. Two other hoses deliver the water and the inert gas to the torch. At the front end of the torch handle is a torch head or neck that includes a gas nozzle, an electrode-holding collet, a collet body, and a gas diffuser. The torch head is usually angularly offset from the handle.

TIG torches can be held in various ways. One way is to place the torch handle in the palm of a person's hand like a hand rail and then curl several fingers around the handle. Another way to hold the torch is between the thumb and first two fingers like a pen or pencil.

Prior TIG torch handles were usually cylindrical in shape. That shape made it easy and comfortable for the person to hold in the first way and manipulate the torch for proper welding action. However, the prior cylindrical torch handles had disadvantages. Their shapes were uncomfortable to hold in the second way, e.g., like a pen or pencil. For example, the cylindrical surfaces were prone to move, both rotationally and longitudinally, between the person's fingers and thumb. That was especially true if the person was wearing gloves. Consequently, to prevent movement, the person had to hold the torch with a greater force than was desirable.

One attempt at improving a TIG torch involved making a handle with an enlarged gripping area. U.S. Pat. No. 5,916,465 shows a TIG torch with a generally spherical cover made of a resilient material. The combination of the resilient material and the enlarged area of the cover increased the mechanical advantage when held between the person's palm and fingers. The U.S. Pat. No. 5,916,465 patent also teaches some longitudinal grooves in the torch handle. Neither the spherical cover nor the grooves provided any benefit regarding angular orientation of the torch in the person's hand or holding the torch like a pencil.

Other prior TIG torch handles were covered with generally cylindrical sleeves made of relatively soft synthetic materials. Those torch handles, too, lacked any orienting qualities, and they provided little help with the movement problem for the various ways of holding the torch.

U.S. Pat. No. 5,571,427 discloses a TIG torch having a torch handle with a generally D-shaped cross-section. The D-shape improved the ergonomic fit and resistance to movement compared with cylindrical torch handles when held in the first manner. On the other hand, the round portion of the handle rendered it uncomfortable for the fingers when the torch was held like a pen or pencil.

Thus, despite previous attempts to improve the holding characteristics of TIG torches, further improvements are desirable.

SUMMARY OF THE INVENTION

In accordance with the present invention, an ergonomic tungsten inert gas (TIG) torch is provided that is both more comfortable and more convenient to hold than prior torches. This is accomplished by contouring the torch to suit the fingers of a person holding it like a pen or pencil.

The torch of the invention may be water-cooled or air-cooled. In a water-cooled torch, a longitudinally extending gas tube joins to a barrel, which is usually angularly offset from the longitudinal direction of the gas tube. The gas tube communicates with the interior of the barrel. The barrel holds the welding electrode. A water inlet tube and water outlet tube run longitudinally in close proximity to the gas tube. The water inlet and outlet tubes may be a continuous tube that loops around the barrel and doubles back on itself. The water and gas tubes and the barrel form a skeleton of the torch. Flexible hoses connect the water and gas tubes to the welding machine. A braided cable inside one of the water hoses conducts electrical power to the torch.

In an air-cooled torch, the skeleton is comprised of the gas tube and the barrel. The gas tube may contain a valve that is used to control the flow of the inert gas. A single hose connects the torch to the welding machine. The hose also contains a braided electrical power cable.

The torch skeleton is covered with a contoured grip. According to one aspect of the invention, the grip is molded from a thermosetting plastic material that remains slightly soft and resilient after curing. The grip material fills the spaces between and around the water and/or gas tubes and provides some mechanical strength to the torch. A back end of the grip is designed to be captured in one end of a rigid sleeve that is part of the torch.

It is a feature of the invention that the exterior surface of a head of the grip is contoured in a manner that renders it exceptionally comfortable to hold like a pen or pencil in a person's fingers. For that purpose, the contour of the grip head diverges in a smooth non-linear manner toward its ends. For example, the grip head contour may have a concave shape in longitudinal cross-section.

The grip head contour is further formed with multiple flattened gripping areas spaced around the circumference of the grip head. The gripping areas are relatively long compared with their widths. In a preferred embodiment, there are multiple gripping areas. The first may be perpendicular to and symmetrical about a first longitudinal plane through the grip head. A second gripping area lies in a second longitudinal plane that makes an angle of between approximately 10 degrees and 30 degrees with the first longitudinal plane. A third gripping area lies in a third longitudinal plane that is on the opposite side of the first longitudinal plane as the second gripping area. The third gripping area also makes an angle of between approximately 10 degrees and 30 degrees with the first longitudinal plane. All the gripping areas are preferably equidistant from the grip head longitudinal axis. Each gripping area preferably has a textured non-slip surface.

When a person holds the torch head like a pencil, the forefinger contacts the first gripping area. Simultaneously, the person's thumb contacts the second or third gripping area, and the side of the person's middle finger contacts the remaining gripping area. In the preferred embodiment, the gripping areas are further arranged such that the longitudinal plane to which the first gripping area is perpendicular contains the longitudinal centerline of the electrode.

The flat textured gripping areas provide several benefits to TIG torches. As one benefit, the gripping areas render the torch resistent to rotation between the person's fingers. Consequently, the person need not exert as much gripping force as with prior torches to keep the torch in place. A second advantage is that the gripping areas provide an inherent orientation of the torch electrode relative to the person's fingers. The person is thus able to quickly establish correct orientation of the electrode to a workpiece.

Other advantages, benefits, and features of the present invention will become apparent to those skilled in the art upon reading the detailed description of the invention.

BRIEF DESCRIPTION OF THE DRAWINGS

FIG. 2 is a perspective view of the grip of the invention.

FIG. 3 is a partial longitudinal cross-sectional view of a water cooled torch that includes the present invention.

FIG. 4 is a cross-sectional view taken along line 4—4 of FIG. 3.

FIG. 5 is a view similar to FIG. 3, but showing an air-cooled torch that includes the grip of the invention.

FIG. 6 is a cross-sectional view taken along line 6—6 of FIG. 5.

FIG. 7 is a perspective view of a grip modified to suit an air-cooled torch with a valve.

DETAILED DESCRIPTION OF THE INVENTION

Figure 1:
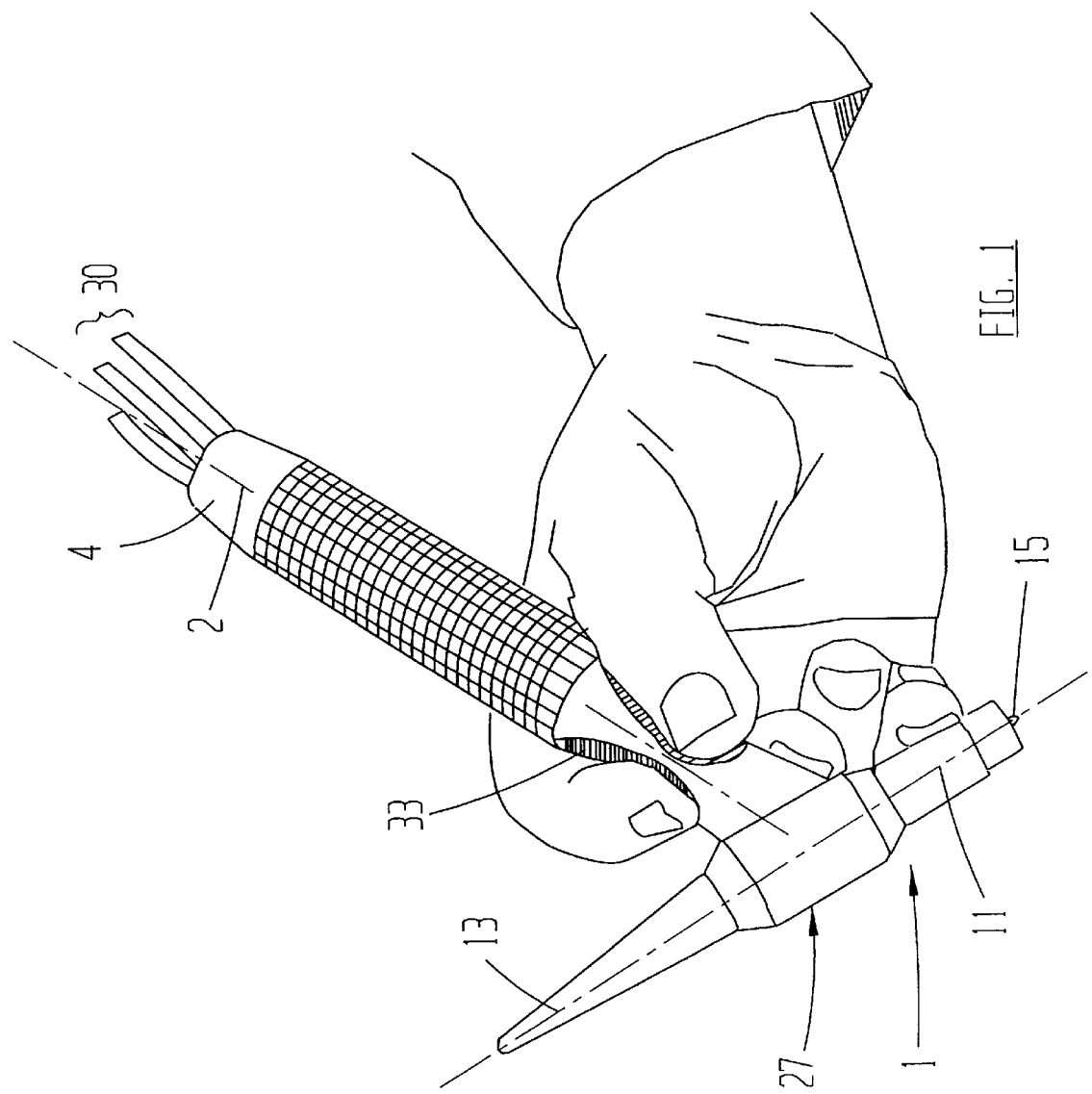
FIG. 1 is a perspective view of a person's hand holding an ergonomic torch according to the invention

Although the disclosure hereof is detailed and exact to enable those skilled in the art to practice the invention, the physical embodiments herein disclosed merely exemplify the invention, which may be embodied in other specific structures. The scope of the invention is defined in the claims appended hereto.

Referring to FIG. 1, a typical ergonomic torch 1 is illustrated that includes the present invention. The particular torch 1 illustrated is used in tungsten inert gas (TIG) welding. However, it will be understood that the invention is not limited to welding applications. The torch 1 is water-cooled, but the invention is also applicable to air-cooled torches, as will be explained presently.

Looking also at FIGS. 3 and 4, the torch 1 is comprised of a skeleton 6 that extends along a longitudinal axis 2. The skeleton 6 includes a pair of tubes 17 and 19 parallel to the longitudinal axis 2. The tube 17 is joined to a conductive barrel 21 that defines an axial centerline 11. The axial centerline 11 makes an angle of approximately 65 degrees with the longitudinal axis 2. The barrel 21 supports a back cap 13 and a known collet and collet body that hold an electrode 15. A hole 23 through the wall of the barrel 21 allows inert gas carried by the tube 17 to flow into the interior of the barrel in known manner. As shown, the tube 19 loops around and is joined to the barrel and doubles back parallel to the axis 2. The tube 19 carries cooling water. The skeleton usually includes a collar 25 through which the tubes 17 and 19 pass and to which they are joined. The tubes 17 and 19 connect by fittings, not shown, to flexible hoses 30. The hoses 30 conduct the water, inert gas, and electrical power from a welding machine to the torch.

In accordance with the present invention, the torch 1 further includes an ergonomic grip 27. The grip 27 is made of an insulative synthetic material, such as a liquid injection moldable silicone rubber of 70 durometer, such as that made by General Electric Company, that is molded in place over the skeleton 6 of the tubes 17 and 19, barrel 21, and collar 25. In the illustrated construction, the grip has a longitudinal portion 28 that surrounds the tubes 17 and 19. The longitudinal portion 28 has a hub 29 and ribs 31 on which a sleeve 4 is captured. The grip also surrounds the barrel with an angular portion 32. Also see FIG. 2.

In the illustrated construction, the grip longitudinal portion 28 has a head 26 between the hub 29 and the angular portion 32. The head 26 has an external contour 34 that is slightly concave in longitudinal cross-section. The contour 34 is formed with one or more gripping areas. As shown, there are three gripping areas 33, 35, 37 each extending longitudinally along the grip 27. Each gripping area 33, 35, 37 is relatively long compared with its width. Each gripping area preferably has a flat area 39 between curved end areas 41. It is preferred that the gripping areas' flat areas 39 have textured non-slip surfaces. For example, the flat areas may be formed with parallel raised ribs.

In the preferred embodiment, the flat area 39 of the first gripping area 33 is perpendicular to and symmetrical about a longitudinal plane 43 through the torch longitudinal axis 2 and also through the barrel axial centerline 11. The flat area 39 is at a distance X from the longitudinal axis 2 that is sufficient to maintain a comfortable temperature to the operator's hands. The second gripping area 35 has a flat area 39A in a longitudinal plane 45 that makes an angle A with the plane 43. The flat area 39B of the gripping area 37 lies in a longitudinal plane 47 that is at an angle B from the plane 43 and on the opposite side thereof as the gripping area 35. The angles A and B may be equal and between approximately 10 degrees and 30 degrees. Preferably, the angles A and B are between approximately 15 degrees and 20 degrees, and the most preferred angle is approximately 18 degrees. The flat areas 39A and 39B are the same distance X from the longitudinal axis 2 as the flat area 39 of the gripping area 33. As illustrated, the gripping area flat areas 39, 39A, 39B are parallel to the handle longitudinal axis 2. However, if desired, the gripping area flat areas may be at an angle to the longitudinal axis. For example, the flat areas can converge at a slight angle toward the angular portion 32.

In one embodiment of the invention, the contour 34 of the grip head 26 has a diameter of approximately 0.88 inches adjacent the hub 29 and adjacent the angular portion 32. The contour 34 has a diameter of approximately 0.75 inches midway between the hub 29 and the angular portion 32. The distance X between the longitudinal axis 2 and the flat areas of the three gripping areas is approximately 0.31 inches. The angles A and B are approximately 18 degrees.

The locations of the three gripping areas 33, 35, 37 make the torch 1 exceptionally comfortable when it is held like a pen or pencil, FIG. 1. The gripping area 33 underlies the forefinger of the operator who holds the torch head 26 in a normal manner. Similarly, the gripping area 35 underlies the end of the person's thumb, and the third gripping area 37 underlies the side of the middle finger.

The gripping areas 33, 35, 37 also render the torch 1 resistant to rotation about the longitudinal axis 2 in the operator's hand. Accordingly, the operator need exert only a small holding force to prevent movement of the torch, even if he is wearing gloves. The relative locations of the gripping areas enable both right handed and left handed operators to use the torch with ease. The gripping areas also provide the important benefit of indicating the orientation of the electrode 15 in space. The natural tendency for the operator to put his thumb and first two fingers against the three gripping areas, and the resulting tactile feel, inherently indicate the orientation of the electrode.

Turning to FIGS. 5 and 6, an ergonomic TIG torch 57 is shown. The torch 57 is generally similar to the torch 1 described previously in conjunction with FIGS. 1–4, but the torch 57 is air-cooled rather than water-cooled. Consequently, the skeleton 60 of the torch 57 is comprised of a single tube 59 that is joined to a barrel 21'. The tube 59 is also joined to a collar 25', which is part of the skeleton 60.

The torch 57 includes an ergonomic grip 27' that is substantially identical to the grip 27 described previously. That is, the grip 27' has three gripping areas 33', 35', and 37', at the same locations relative to each other and to the torch longitudinal axis 2' as the corresponding components of the grip 27.

FIG. 7 shows a modified grip 49 according to the invention. The grip 49 is used with air-cooled torches that have a gas valve, not illustrated in the drawings but well known to persons skilled in the art. The gas valve has a knob that projects upwardly in the plane containing the torch longitudinal axis 54 and the barrel axial centerline 56. The grip 49 has a longitudinal portion 50 that includes a ribbed hub 61, and an angular portion 63 that surrounds the torch barrel. A head 65 between the hub 61 and the angular portion 63 has an external contour 52 that is slightly concave in longitudinal cross-section. To accommodate the gas valve knob, the longitudinal portion 50 has a short cross tube 53 with an opening 55.

The grip 49 requires only two gripping areas. The first gripping area is shown at reference numeral 69, and it is analogous to the gripping area 35 of the grip 27 (FIG. 2). The second gripping area of the grip 49 is not shown, but it is analogous to the gripping area 37 of the grip 27 as shown in FIG. 4.

Thus, it is apparent that there has been provided, in accordance with the invention, an ergonomic TIG torch that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A welding torch comprising:
   a. an electrically conductive barrel that defines a barrel axial centerline, and at least one electrically conductive tube joined to the barrel; and
   b. a grip made of an insulative material and having an angular portion that surrounds the barrel and a longitudinal portion that surrounds a substantial length of said at least one tube, the grip longitudinal portion having an external contour that is generally circular in transverse cross-section, a first end that joins to the angular portion, and a second end, the grip longitudinal portion defining a longitudinal axis and being formed with a plurality of gripping areas in the external contour that are spaced apart circumferentially from each other by sections of the external contour, each gripping area having a flat area.

2. The welding torch of claim 1 wherein there are three spaced apart gripping areas, and wherein the flat areas of the gripping areas are substantially equal in area.

3. The welding torch of claim 2 wherein:
   a. the first gripping area has a flat area that is perpendicular to and symmetrical about a first longitudinal plane through the grip longitudinal axis;
   b. the flat area of a second gripping area lies in a second longitudinal plane that makes a predetermined angle with the first longitudinal plane;
   c. the flat area of a third gripping area lies in a third longitudinal plane that makes a second predetermined angle with the first longitudinal plane; and
   d. the flat area of each gripping area is equidistant from the grip longitudinal axis.

4. The welding torch of claim 3 wherein the first and second predetermined angles are each between approximately 10 degrees and 30 degrees.

5. The welding torch of claim 3 wherein the first and second predetermined angles are each approximately 18 degrees.

6. A welding torch comprising:
   a. a skeleton comprising a barrel that defines a barrel axial centerline and at least one tube joined to the barrel; and
   b. a grip made of an insulative material and surrounding the skeleton, the grip defining a longitudinal axis and having a longitudinal portion that defines a plurality of gripping areas that are spaced apart around a circumference of the longitudinal portion, each gripping area having a flat area, wherein the grip longitudinal portion has an external contour that is concave in longitudinal cross-section through the longitudinal axis.

7. The welding torch of claim 6 wherein each gripping area has at least one curved area between the flat area and the external contour of the grip longitudinal portion.

8. Welding apparatus held in a person's thumb and first and second fingers like a pen or pencil comprising a grip made from an insulative material and having a longitudinal portion that defines a longitudinal axis and an angular portion that defines an axial centerline that is at a predetermined angle to the longitudinal axis, the grip longitudinal portion having an external contour with a plurality of gripping areas each having a flat area, the gripping areas being spaced apart around a circumference of the grip external contour and being separated from each other by sections of the external contour.

9. The welding apparatus of claim 8 wherein:
   a. the welding apparatus comprises a gas valve;
   b. the grip longitudinal portion is fabricated with a cross tube having an opening that accommodates the gas valve; and
   c. the grip external contour defines first and second gripping areas, the first gripping area contacting the person's thumb, and the second gripping area contacting the person's third finger when the person's fingers hold the grip external contour.

10. The welding apparatus of claim 8 wherein the distances of the gripping area flat areas to the longitudinal axis are equal.

11. Welding apparatus held in a person's thumb and first and second fingers like a pen or pencil comprising a grip made from an insulative material and having a longitudinal portion that defines a longitudinal axis and an angular portion that defines an axial centerline that is at a predetermined angle to the longitudinal axis, the grip longitudinal portion having an external contour with a plurality of gripping areas each having a flat area, the gripping areas being spaced apart around a circumference of the grip external contour, wherein the grip external contour defines first, second, and third gripping areas, the first gripping area contacting the person's first finger, the second gripping area contacting the person's thumb, and the third gripping area contacting the person's third finger when the person's fingers hold the grip external contour, and wherein each gripping area has a flat area, and a pair of opposed curved areas that connect the respective flat areas to the grip external contour.

12. The welding apparatus of claim 11 wherein:
   a. the first gripping area is perpendicular to a selected longitudinal plane through the longitudinal axis;
   b. the second gripping area lies in a first plane that makes a first predetermined angle with the selected longitudinal plane; and
   c. the third gripping area lies in a second plane that makes a second predetermined angle with the selected longitudinal plane.

13. The welding apparatus of claim 12 wherein the first and second predetermined angles are equal.

14. The welding apparatus of claim 12 wherein the first and second predetermined angles are each within the range of between approximately 10 degrees and 30 degrees.

15. The welding apparatus of claim 12 wherein the first and second predetermined angles are each approximately 18 degrees.

16. The welding apparatus of claim 12 wherein:
   a. the grip further comprises an angular portion having an axial centerline that makes a predetermined angle with the grip longitudinal axis; and
   b. the angular portion axial centerline lies in the selected longitudinal plane.

17. Welding apparatus held in a person's thumb and first and second fingers like a pen or pencil comprising a grip made from an insulative material and having a longitudinal portion that defines a longitudinal axis and an angular portion that defines an axial centerline that is at a predetermined angle to the longitudinal axis, the grip longitudinal portion having an external contour with a plurality of gripping areas each having a flat area, the gripping areas being spaced apart around a circumference of the grip external contour, wherein the grip external contour defines first, second, and third gripping areas, the first gripping area contacting the person's first finger, the second gripping area contacting the person's thumb, and the third gripping area contacting the person's third finger when the person's fingers hold the grip external contour, and wherein each of the gripping areas is recessed from the grip external contour.

* * * * *